United States Patent
Griffin

(10) Patent No.: US 7,327,961 B2
(45) Date of Patent: Feb. 5, 2008

(54) DIFFERENTIAL ENCODER FOR AN OPTICAL DQPSK MODULATOR

(75) Inventor: Robert Griffin, Towcester (GB)

(73) Assignee: Bookham Technology, plc, Towcester (GB)

( * ) Notice: Subject to any disclaimer, the term of this patent is extended or adjusted under 35 U.S.C. 154(b) by 579 days.

(21) Appl. No.: 10/497,551

(22) PCT Filed: Nov. 29, 2002

(86) PCT No.: PCT/GB02/05391

§ 371 (c)(1),
(2), (4) Date: Jun. 1, 2004

(87) PCT Pub. No.: WO03/049393

PCT Pub. Date: Jun. 12, 2003

(65) Prior Publication Data

US 2005/0074245 A1    Apr. 7, 2005

(30) Foreign Application Priority Data

Nov. 30, 2001   (GB)   ................................. 0128783.8

(51) Int. Cl.
*H04B 10/04*   (2006.01)
*H04B 10/12*   (2006.01)

(52) U.S. Cl. ........................ 398/188; 398/198; 398/183
(58) Field of Classification Search ................ 398/188, 398/198, 183, 185; 359/279
See application file for complete search history.

(56) References Cited

U.S. PATENT DOCUMENTS 4,893,352 A    1/1990  Welford
5,222,103 A *  6/1993  Gross ......................... 375/281

FOREIGN PATENT DOCUMENTS

GB    2 370 473 A    6/2002
JP    4 310038       11/1992

\* cited by examiner

*Primary Examiner*—M. R. Sedighian
(74) *Attorney, Agent, or Firm*—Lahive & Cockfield, LLP; Anthony A. Laurentano, Esq.

(57)    ABSTRACT

A modulator arrangement adapted to use a differential quadrature phase shift key for use in an optical wavelength division multiplex (WDM) optical communications system, comprising a precoder (16), which is adapted to generate drive voltages for first and second phrase modulators (6, 8) in dependence upon first and second data streams. The respective drive voltages for the first and second modulators (6, 8) are fed back to the precoder inputs with a delay related to the line speed of the data system, wherein the length of the delay corresponds to n bits.

7 Claims, 5 Drawing Sheets

DIFFERENTIAL ENCODER FOR AN OPTICAL DQPSK MODULATOR

RELATED APPLICATIONS

This application is a 35 U.S.C. 371 national stage filing of International Application No. PCT/GBO2/05391, filed 29 Nov. 2002, which claims priority to Great Britain Patent Application No. 0128783.8 filed on 30 Nov. 2001, in Great Britain. The contents of the aforementioned applications are hereby incorporated by reference.

BACKGROUND OF THE INVENTION

This invention relates to optical communications and in particular to a method of modulating an optical carrier for use in a wavelength division multiplex (WDM) optical communications system.

In this specification the term "light" will be used in the sense that it is used generically in optical systems to mean not just visible light but also electromagnetic radiation having a wavelength between 800 nanometres (nm) and 3000 nm. Currently the principal optical communication wavelength bands are centered on 1300 nm, 1550 nm (C-Band) and 1590 nm (L-Band), with the latter bands receiving the majority of attention for commercial exploitation.

Exemplary WDM systems operating in the 1550 nm C-Band optical fibre communication band are located in the infrared spectrum with International Telecommunication Union (ITU) 200, 100 or 50 GHz channel spacing (the so called ITU Grid) spread between 191 THz and 197 THz.

With ongoing developments in optically amplified dense wavelength division multiplex (DWDM) optical links as the backbone of point-to-point information transmission and the simultaneous increase in bit rate applied to each wavelength and the simultaneous increase in the number of channels, the finite width of the erbium gain window of conventional erbium-doped optical amplifiers (EDFAs) could become a significant obstacle to further increases in capacity. Conventional EDFAs have a 35 nm gain bandwidth which corresponds to a spectral width of 4.4 THz. System demonstrations of several Tbit/s data rate are already a reality and the spectral efficiency, characterized by the value of bit/s/Hz transmitted, is becoming an important consideration. Currently, high-speed optical transmission mainly employs binary amplitude keying, using either non-return-to-zero (NRZ) or return-to-zero (RZ) signalling formats, in which data is transmitted in the form of optical pulses having a single symbol level.

In WDM several factors limit the minimum channel spacing for binary amplitude signaling, and in practice spectal efficiency is limited to ~0.3 bits/Hz. Although increasing the per-channel bit rate tends to reduce system equipment, there are several problems that need to be overcome for transmission at bit rates above 10 Gbit/s; these being:

- dispersion management of the optical fibre links, this becomes increasingly difficult with increased bit rate;
- Polarisation mode dispersion (PMD) in the optical fibre causes increased signal degradation;
- Realization of electronic components for multiplexing, de-multiplexing and modulator driving becomes increasingly difficult.

One technique which has been proposed which allows an improvement of spectral efficiency is the use of quadrature phase shift keying (QPSK) [S. Yamazaki and K. Emura, (1990) "Feasibility study on QPSK optical heterodyne detection system", J. Lightwave Technol., vol. 8, pp. 1646-1653]. In optical QPSK the phase of light generated by a transmitter laser is modulated either using a single phase modulator (PM) driven by a four-level electrical signal to generate phase shifts of $0$, $\pi/2$, $\pi$ or $3\pi/2$ representative of the four data states, or using two concatenated phase modulators which generate phase shifts of $0$ or $\pi/2$ and $\pi$ or $3\pi/2$ respectively. A particular disadvantage of QPSK is that demodulation requires, at the demodulator, a local laser which is optically phase-locked to the transmitter laser. Typically this requires a carrier phase recovery system. For a WDM system a phase-locked laser will be required for each wavelength channel. It further requires adaptive polarisation control which, in conjunction with a phase recovery system, represents a very high degree of complexity. Furthermore, systems that require a coherent local laser are sensitive to cross-phase modulation (XPM) in the optical fibre induced by the optical Kerr non-linearity, which severely restricts the application to high capacity DWDM transmission.

It has also been proposed to use differential binary phase shift keying (DBPSK) [M. Rohde et al (2000) "Robustness of DPSK direct detection transmission format in standard fibre WDM systems", Electron Lett., vol. 36]. In DBPSK data is encoded in the form of phase transitions of $0$ or $\pi$ in which the phase value depends upon the phase of the carrier during the preceding symbol interval. A Mach-Zehnder interferometer with a delay in one arm equal to the symbol interval is used to demodulate the optical signal. Although DBPSK does not require a phase-locked laser at the receiver it does not provide any significant advantages compared to conventional amplitude NRZ signalling.

U.S. Pat. No. 6,271,950 discloses a differential phase shift keying optical transmission system, comprising a laser to generate an optical signal, a delay encoder to provide a different delay for each of M input channels and an M channel phase modulator which phase modulates the optical carrier signal with each of the differently delayed M input signal channels to form a time division multiplex (TDM) phase modulated optical signal.

However, in modern communication systems, the rate of development dictates that typically data streams multiply up by a factor of 4 every few years. At the time of application the proposed standard installation will use data streams of 10 Gbit/s and systems of 40 Gbit/s have been demonstrated. In addition to the matters discussed above, the practical problem then arises that new systems operating at high speeds have to co-operate with older systems.

SUMMARY OF THE INVENTION

The present invention seeks to provide a method for pre-encoding data for use in a high data rate optical communications system that works with a decoder which is substantially the same decoder as used at a lower data rate.

According to the invention, there is provided a modulator arrangement adapted to use a differential quadrature phase shift key for use in an optical wavelength division multiplex (WDM) optical communications system, comprising a precoder, which precoder is adapted to generate drive voltages for first and second phase modulators in dependence upon first and second data streams, wherein the respective drive voltages for the first and second modulators are fed back to the precoder inputs with a delay, wherein the length of the delay is related to the line speed of the data stream.

Preferably, the length of the delay corresponds to n bits, wherein n is proportional to data stream speed. Preferably, where the data stream speed is 20 Gsymbols/s for each data stream, n is equivalent to 4 symbols or 200 ps.

In a preferred embodiment, the precoder output data streams are given by logical equations:

$$I_k = \overline{(Q_{k-n} \oplus I_{k-n})(V_k \oplus I_{k-n})} + (Q_{k-n} \oplus I_{k-n})\overline{(U_k \oplus I_{k-n})}$$

$$Q_k = \overline{(Q_{k-n} \oplus I_{k-n})(U_k \oplus I_{k-n})} + (Q_{k-n} \oplus I_{k-n})(V_k \oplus I_{k-n})$$

where n is the number of bits in the delay, $U_k$ and $V_k$ are the incoming data streams with a bit rate equal to the symbol rate, k-n being the nth bit precedent to the actual bit of information.

In a preferred embodiment where the modulator arrangement has an input of 2×n subsidiary data streams each at a bit rate of 1/n×the line symbol rate, the precoder arrangement comprises n precoders in parallel. Preferably, the precoder arrangement comprises four precoders in parallel, the outputs of which are fed to one of two respective 4:1 multiplexers, the output of each precoder also being fed via 1 bit delays to its respective inputs, wherein the output of the multiplexers is used to drive the modulators, where the bit rate is proportional to ¼ of the symbol rate, n being equal to 4.

The provision of an n bit delay in the precoder, where n is, say 4 for a 40 Gbit/s system, ensures that more time is available for the preprocessing operation and also that the decoder (also known as a demodulator) hardware can be common to systems having data streams at 10 Gbit/s thereby reducing implementation costs.

BRIEF DESCRIPTION OF THE DRAWINGS

Exemplary embodiments of the precoder and decoder invention will now be described in greater detail with reference to the drawings in which.

DESCRIPTION OF ILLUSTRATED EMBODIMENT

Figure 1:
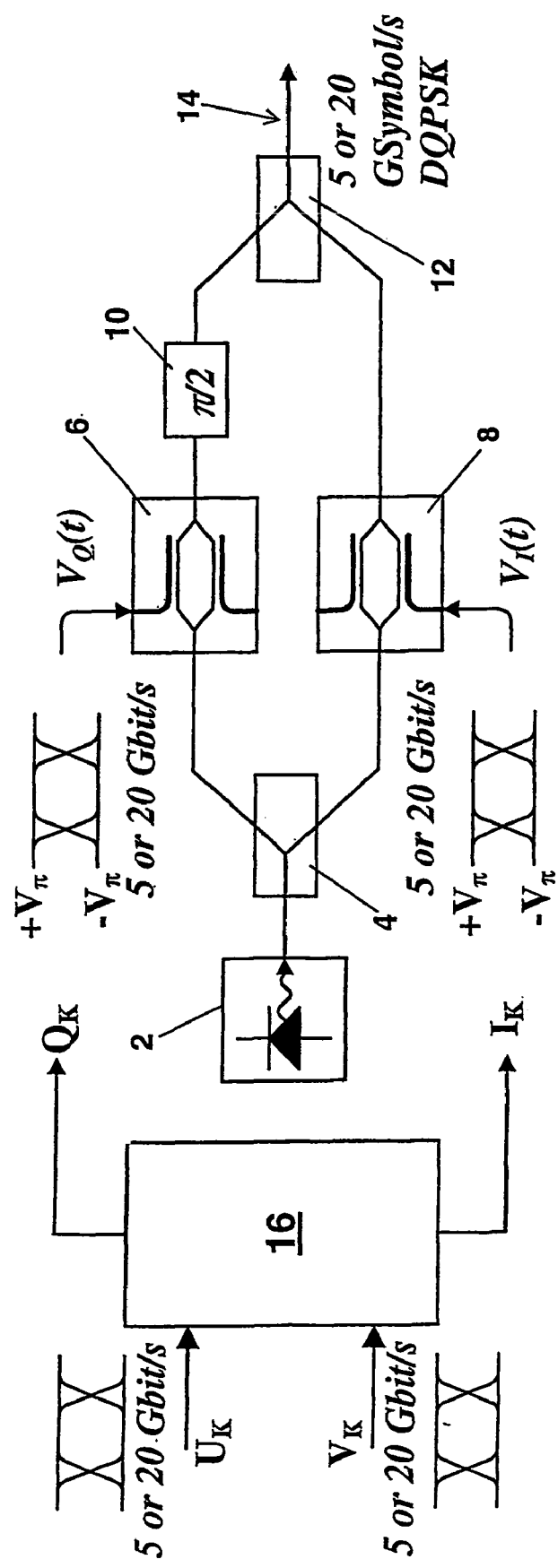
FIG. 1 is a schematic representation of an optical modulator arrangement.

Referring to FIG. 1 there is shown an optical phase shift key modulator arrangement in accordance with the invention for encoding two 20 Gbit/s NRZ data streams $U_k$, $V_k$ onto a single optical carrier. Typically the modulator arrangement would be used as part of a transmitter in a WDM optical communications system with a respective modulator arrangement for each WDM wavelength channel.

The modulator arrangement comprises a single frequency laser 2, for example a distributed feedback (DFB) semiconductor laser due to its stable optical output for a given wavelength, which is operated to produce an unmodulated optical output of a selected wavelength, typically a WDM wavelength channel. Light from the laser is divided by an optical splitter 4 into two parts and each part is applied to a respective phase modulator 6, 8. Each phase modulator 6, 8 is configured such that it selectively modulates the phase by 0 or π radians in dependence upon a respective binary (bipolar) NRZ drive voltage $V_I(t)$, $V_Q(t)$. In the preferred arrangement illustrated in FIG. 1 the phase modulators 6, 8 each comprise a Mach-Zehnder electro-optic modulator (MZM) which is fabricated for example in gallium arsenide or lithium niobate. As is known MZMs are widely used as optical intensity modulators and have an optical transmission versus drive voltage characteristic which is cyclic and is generally raised cosine in nature. The half period of the MZM's characteristic, which is measured in terms of a drive voltage, is defined as $V_\pi$. Within the modulator arrangement of the present invention each MZM 6, 8 is required to operate as a phase modulator without substantially affecting the amplitude (intensity) of the optical signal. To achieve this each MZM 6, 8 is biased for minimum optical transmission in the absence of a drive voltage and is driven with a respective drive voltage $V_I(t)$, $V_Q(t) = \pm V_\pi$ to give abrupt phase shifting with a minimum of amplitude modulator The two phase modulators 6, 8 have matched delays (phase characteristics).

The optical output from the phase modulator 6 is passed through a phase shifter 10 which applies a phase shift of π/2 such that the relative phase difference between the optical signals passing along the path containing the modulator 6 and that passing along the path containing the modulator 8 is ±π/2. The optical signals from the phase shifter 10 and phase modulator 8 are recombined by an optical recombiner 12, for example a 3 dB coupler, to form an optical phase shift key (PSK) output 14. The phase shift may be substantially provided by the cooperation of MMIs forming the splitter 4 and recombiner 12, together with a control electrode to provide fine control.

The phase modulator drive voltages $V_I(t)$, $V_Q(t)$ are generated by pre-coding circuitry 16 in dependence upon the two binary data streams $U_k$, $V_k$. According to the modulator arrangement of the present invention the two data streams $U_k$, $V_k$ are differentially encoded such that these data are encoded onto the optical signal 14 in the phase transitions (changes) rather than in the absolute phase value. As a result it will be appreciated that the optical signal 14 is differential quadrature phase shift key (DQPSK) encoded.

The DQPSK optical signal 14 is ideally given by $E_0 \exp(i\omega t + \theta + \theta_i)$, where ω is the mean optical angular frequency, t is time, θ the carrier phase and $\theta_i$ a data dependent phase modulation for the i-th data symbol $d_i$. In the general cased $d_i \in \{0, 1, \ldots M-1\}$ and for quarternary phase shift keying M=4, that is the data symbol has four values. The phase modulation term is given by $\theta_i = \theta_{i-n} + \Delta\theta_i(d_i)$ in which $\theta_{i-1}$ is the phase term for the previous data symbol $d_{i-1}$ and $\Delta\theta_i$ the change in phase between the i-n and i-th data symbols. The relationship between data symbol $d_i$ and phase shift $\Delta\theta_i$ for QPSK is tabulated below.

TABLE 1

Values of data $U_k$, $V_k$, data symbol $d_i$ and phase change $\Delta\theta_i(d_i)$ for DQPSK.

| $U_k$ | $V_k$ | $d_i$ | $\Delta\theta_i (d_i)$ |
|---|---|---|---|
| 0 | 0 | 0 | 0 |
| 0 | 1 | 1 | π/2 |
| 1 | 0 | 2 | π |
| 1 | 1 | 3 | 3π/2 |

It is to be noted that the mapping between data, data symbol and phase change is just one example and that other mappings can be used. The pre-coding circuitry 16, a logical representation of which is shown in FIG. 2, is configured such as to produce the appropriate drive voltages $V_I(t)$, $V_Q(t)$ in dependence upon the two data streams $U_k$, $V_k$ according to the relationships:

$$V_I(i) = V_I(i-1)\cos \Delta\theta(d_i) - V_Q(i-1)\sin \Delta\theta(d_i) \quad \text{Eq. 1}$$

$$V_Q(i) = V_I(i-1)\sin \Delta\theta(d_i) + V_Q(i-1)\cos \Delta\theta(d_i) \quad \text{Eq. 2}$$

Figure 2:
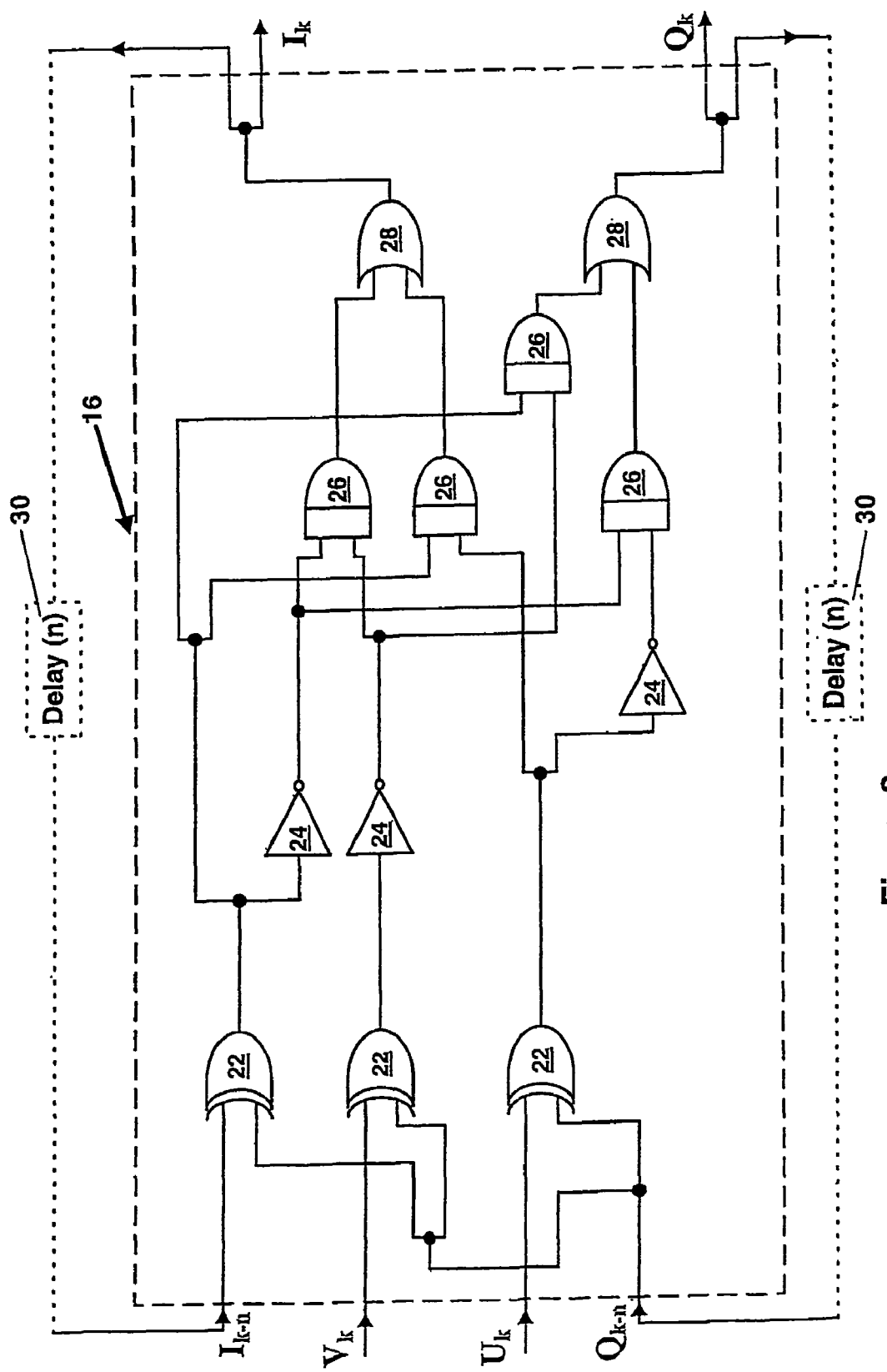
FIG. 2 is a representation of the logical elements of the pre-coding every of the modulator arrangement of FIG. 1.

FIG. 2 shows the logical representation of the precoding circuitry 16, in which elements having the same functionality are given like reference numerals. These comprise XOR gates 22, inverters 24, AND gates 26 and OR gates 28.

The benefit of encoding the data signal as a phase difference between symbols is that the encoding has a greater resilience since much of the cross-phase modulation will be common between the respective symbols.

In a system operating at 40 Gbit/s, there is only a 50 ps separation between successive symbols in the data stream (each symbol being two bits). This duration is about at the limit of current precoder electronics ability to process due to gate delays. With reference to FIG. 2. to provide more useable separation between successive symbols, each output I and Q of the precoder 16 is fed back to the incoming data stream via a delay element 30, which imparts a delay of $n\tau$ to the signal, where $\tau$ is the intersymbol separation period (also equal to input data stream bit rate), and n is an integer. This delay can be varied in dependence on the data stream line rate.

The data streams $I_k$ and $Q_k$ used to calculate the drive voltages can be derived from the logical equations:

$$I_k = \overline{(Q_{k-n} \oplus I_{k-n})} \; \overline{(V_k \oplus I_{k-n})} + (Q_{k-n} \oplus I_{k-n})\overline{(U_k \oplus I_{k-n})}$$

$$Q_k = \overline{(Q_{k-n} \oplus I_{k-n})} \; \overline{(U_k \oplus I_{k-n})} + (Q_{k-n} \oplus I_{k-n})(V_k \oplus I_{k-n})$$

where n is the number of bits in the delay, $U_k$ and $V_k$ are the incoming data stream, k-n being the nth bit precedent to the actual bit of information. Whilst the logic of FIG. 2. is shown as being asynchronous in practice the inputs and outputs of the precoder logic will be clocked via latches so that it functions in a synchronous manner with the rest of the date. Accordingly the delay 30 will comprise shift registers in dependence upon the number of data bit intervals delay required. The precoder design, of which FIG. 2 is just one implementation of the logical function, is such that there is a minimum propagation delay between its input(s) and output(s) and such propagation delay as there is must be less than one bit period (i.e. one clock cycle) of the input data. This sets a critical demand upon the electronic logic which can be used. A 20 GBit/s data input precoder would require an electronic clock period of 50 ps i.e a clock of 20 GHz. Such speeds are difficult to achieve and require bespoke logic designs typically in the form of application specific integrated circuits. For this reason alternative architectures for the precoder function are possible.

Figure 3:
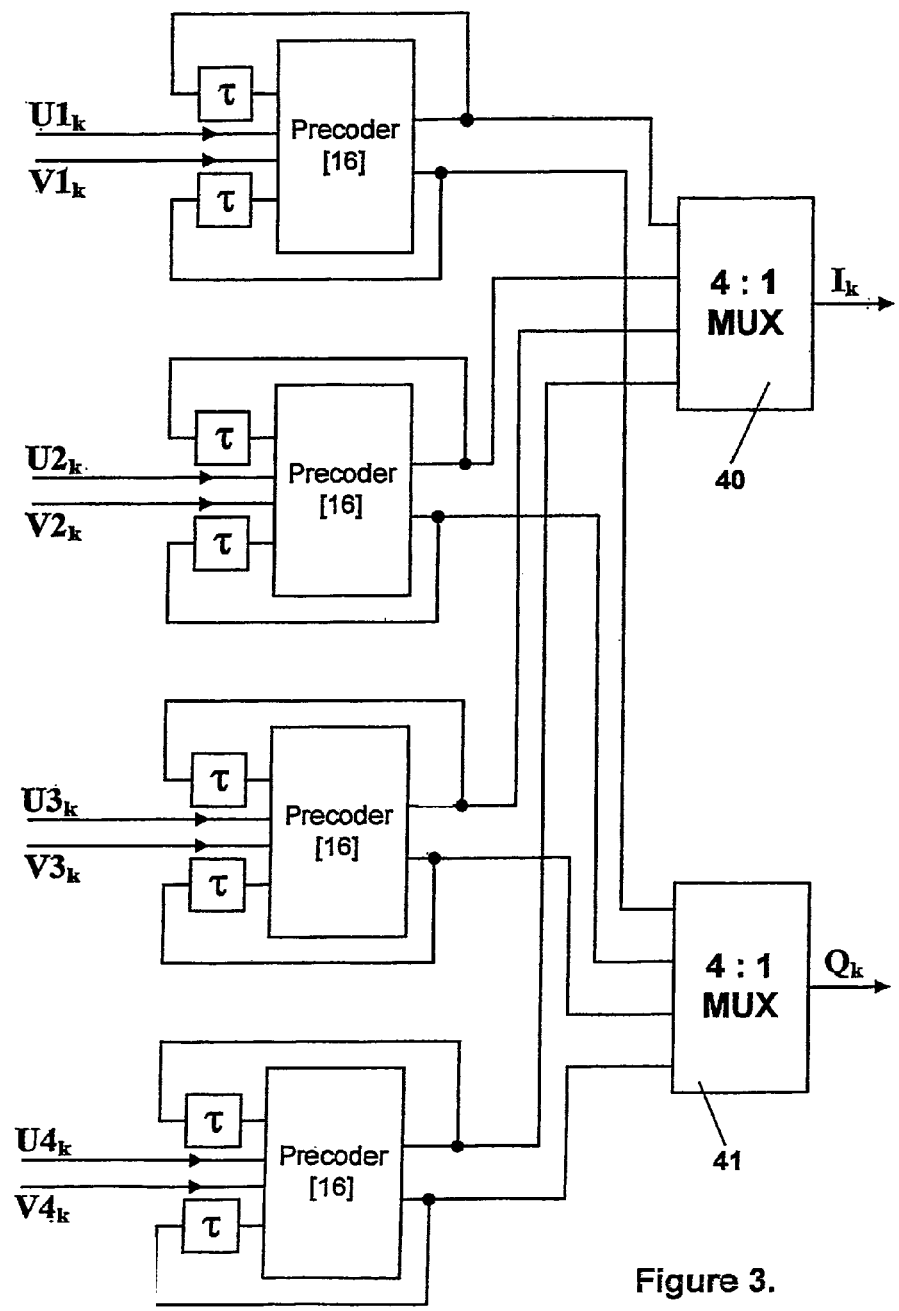
FIG. 3 shows a schematic representation for multiplexing four data streams.

FIG. 3 shows a schematic representation of a precoder arrangement adapted for use in a 40 Gbit/s environment, where the incoming data streams have a line rate of 5 Gbit/s. As it is convenient to multiplex signals at a ratio of 2:1, it is possible to multiplex 8 data streams ($U1_k$, $V1_k$, $U2_k$, $V2_k$ etc.) using 4 precoders 16 in parallel, the outputs of which are passed to two 4:1 multiplexers 40, 41 wherein the $I_{nk}$ outputs feed multiplexer 40, and the $Q_{nk}$ outputs feed multiplexer 41. Each data stream, precoder and multiplexer is functionally equivalent in the arrangement of FIG. 3, the output of each precoder 16 is split, with each output signal being passed to a respective multiplexer and also fed to be incorporated in the input of this precoder with a delay of $\tau$ in each case. The delay $\tau$ is equivalent to one bit period of the data being processed e.g. for a 5 GBit/s system $\tau$=200 ps. The output of the multiplexers 41, 42 are then passed to the modulators 6, 8. The technology required for this implementation is available from Infineon™ (B7HF SiGe process).

Figure 4:
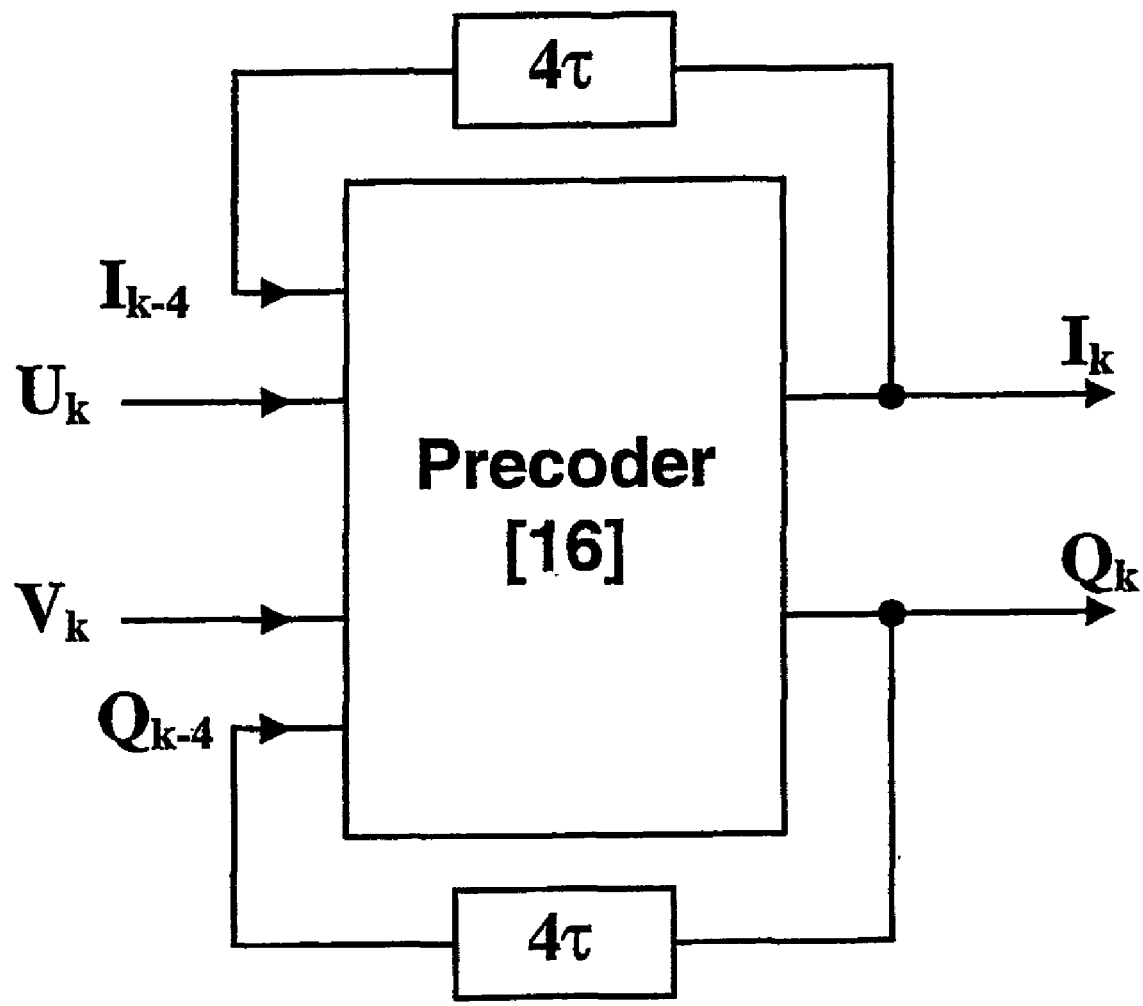
FIG. 4 shows a schematic representation of a precoder for 40 Gbit/s systems.

FIG. 4 shows an alternative arrangement also adapted for use in a 40 Gbit/s environment, in which the data input steams have a line rate of 20 Gbit/s. In this case, a single precoder 16 per data stream pair $U_k$ and $V_k$ is required. The data signal is fed back to the precoder input with a delay of $4\tau$, where $\tau$ is the same delay as is represented by the delay 30 in FIG. 2. With a 20 GBit/s input data stream $\tau$ is 50 ps.

Incorporating a delay of n bits, where n is, say 4 bits for a 40 Gbit/s system, ensures that more time is available for the preprocessing operation and also that the decoder hardware can be common to systems having data streams at 10 Gbit/s, thereby reducing implementation costs.

Figure 5:
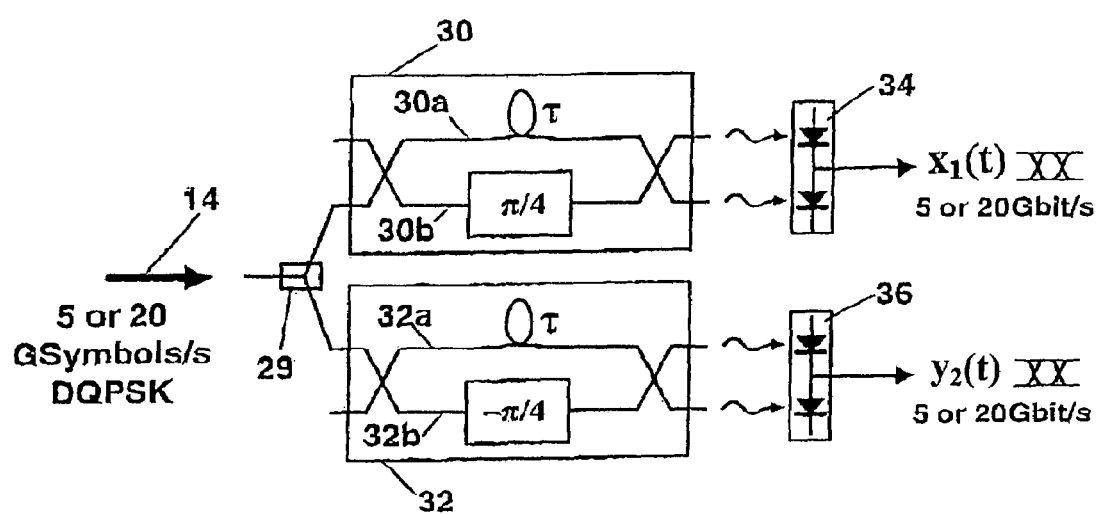
FIG. 5 shows a schematic representation of an optical demodulator for a 5 or 20 Gsymbol/s in accordance with the invention.

FIG. 5 shows a schematic representation of a decoder for demodulating data streams encoded according to the invention. By way of example the decoder is presented for demodulating 10 GBit/s (5 GSymbols/s) and 40 GBit/s (20GSymbols/s) bits streams according to the invention.

Referring to FIG. 5 there is shown a demodulator arrangement in accordance with the invention. The demodulator comprises two equivalent monolithic unbalanced Mach-Zehnder interferometers (MZI). The demodulator comprises an optical splitter 29 for splitting the received 20 GSamples/s DQPSK modulated optical signal 14 into two parts which are applied to a respective unbalanced Mach-Zehnder interferometer (MZI) 30, 32. Typically the MZIs are fabricated as planar optical circuits. A respective balanced optical to electrical converter (detectors) 34, 36 is connected across the optical outputs of each MZI 30, 32. Each MZI 30, 32 is unbalanced in that each has a time delay $\tau$, nominally equal to n×the symbol period (50 ps for a 20 GSymbol/s line rate) of the data modulation rate, in one arm 30a, 32a relative to that of the other arm 30b, 32b. The time delay $\tau$, is introduced by making the optical path length of the two arms different and for ease of fabrication is introduced by making the physical length of the MZI's arm 30a, 32a longer than the other aim 30b, 32b. Each MZI 30, 32 is respectively set to impart a relative phase shift of $\pi/4$ and $-\pi/4$ by the application of an appropriate voltage to electrodes on the shorter arm 30b, 32b. With balanced detection the output electrical signals $x_1(t)$, $y_2(t)$ from the converters 34, 36 is given by:

$$x_1(t), y_2(t) = \cos(\Delta\theta(d_i)) \pm \sin(\Delta\theta(d_i))$$

For DQPSK where $\Delta\theta(d_i)$ takes the possible values $\{0, \pi/2, \pi, 3\pi/2\}$ the outputs are hence binary (bipolar) signals given by:

$$x_1(t) = U_k \text{ and } y_2(t) = V_k$$

A particular benefit of setting the MZIs 30, 32 to impart relative phase shifts between their arms of $\pi/4$ and $-\pi/4$ respectively is that this results in the de-modulated signals $x_1(t)$, $y_2(t)$ being bipolar NRZ signals. It will be appreciated that the in-phase and quadrature components of the DQPSK signal can also be demodulated using other relative phase shifts provided there is a difference of $\pi/2$ between the respective MZIs, though the resulting signals will not be symmetrical bipolar NRZ signals. In the general case, therefore, the MZI 30 is set to impart a phase shift $\phi$ and the MZI 32 set to impart a phase shift $\phi \pm \pi/2$.

Whilst higher delay rates would be possible, it is undesirable to have too high a delay as this will make the system too sensitive to optical phase noise.

The invention claimed is:

1. A modulator arrangement adapted to use a differential quadrature phase shift key for use in an optical wavelength division multiplex (WDM) optical communications system, comprising a precoder adapted to generate drive voltages for first and second optical phase modulators in dependence upon first and second data streams, wherein the respective drive voltages for the first and second optical phase modulators are fed back to one or more inputs of the precoder with a delay, wherein the length of the delay corresponds to n bits, wherein n is variable, and the length of the delay is related to a line speed of the data stream.

2. The modulator arrangement according to claim 1, wherein the length of the delay corresponds to n bits, wherein n is proportional to data stream speed.

3. The modulator arrangement according to claim 2, wherein the data stream speed is 20 Gsymbols/s, and where n is equivalent to 4 bits or 200 ps.

4. The modulator arrangement according to claim 1, wherein the precoder output data streams are given by logical equations:

$$I_k = \overline{(Q_{k-n} \oplus I_{k-n})(V_k \oplus I_{k-n})} + (Q_{k-n} \oplus I_{k-n})\overline{(U_k \oplus I_{k-n})}$$

$$Q_k = \overline{(Q_{k-n} \oplus I_{k-n})(U_k \oplus I_{k-n})} + (Q_{k-n} \oplus I_{k-n})\overline{(V_k \oplus I_{k-n})}$$

where n is the number of bits in the delay, $U_k$ and $V_k$ are the incoming data streams with a bit rate equal to the symbol rate, k-n being the nth bit precedent to the actual bit of information.

5. The modulator arrangement according to claim 1, wherein where the modulator arrangement has 2×n data streams at 1/n symbol rate, and wherein the precoder comprises precoders in parallel.

6. The modulator arrangement according to claim 1, wherein the precoder comprises four precoders in parallel, each of which generates an output, wherein the outputs are fed to one of two respective 4:1 multiplexers, the output of each precoder also being fed via 1 bit delays to its respective inputs, wherein the output of the multiplexers is used to drive the modulators, where the bit rate is proportional to ¼ of the symbol rate, n being equal to 4.

7. A method of pre-coding data for use in an optical communications system having a data rate, by means of a modulator arrangement according to claim 1, the method comprising: providing an n bit delay in the precoder of the modulator arrangement, thereby ensuring that a decoder that is usable only at a lower data rate in the absence of such an n bit delay, is able to decode the data.

* * * * *